US011379211B2

(12) United States Patent
Kruempelmann et al.

(10) Patent No.: US 11,379,211 B2
(45) Date of Patent: Jul. 5, 2022

(54) FENCING EXECUTION OF EXTERNAL TOOLS DURING SOFTWARE CHANGES

(71) Applicant: SAP SE, Walldorf (DE)

(72) Inventors: Wulf Kruempelmann, Altlussheim (DE); Volker Driesen, Heidelberg (DE); Martin Mayer, Heidelberg (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 16/704,953

(22) Filed: Dec. 5, 2019

(65) Prior Publication Data

US 2021/0173626 A1     Jun. 10, 2021

(51) Int. Cl.
    *G06F 8/70*     (2018.01)
    *G06F 8/65*     (2018.01)
    *G06F 16/22*     (2019.01)

(52) U.S. Cl.
    CPC ............ *G06F 8/65* (2013.01); *G06F 16/2282* (2019.01)

(58) Field of Classification Search
    CPC .......... G06F 8/65; G06F 16/2282; G06F 8/71; G06F 16/2358; H04L 67/34
    See application file for complete search history.

(56) References Cited

U.S. PATENT DOCUMENTS

| | | | |
|---|---|---|---|
| 6,735,766 B1 * | 5/2004 | Chamberlain | G06F 8/65 709/203 |
| 6,868,427 B2 | 3/2005 | Herzog et al. | |
| 7,523,142 B2 | 4/2009 | Driesen et al. | |
| 7,949,687 B1 * | 5/2011 | Sinclair | G06F 16/22 707/803 |
| 8,200,634 B2 | 6/2012 | Driesen et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,332,462 B2 | 12/2012 | Kruempelmann | |
| 8,356,010 B2 | 1/2013 | Driesen | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,434,060 B2 | 4/2013 | Driesen et al. | |
| 8,473,942 B2 | 6/2013 | Heidel et al. | |
| 8,479,187 B2 | 7/2013 | Driesen et al. | |
| 8,560,876 B2 | 10/2013 | Driesen et al. | |
| 8,566,784 B2 | 10/2013 | Driesen et al. | |

(Continued)

OTHER PUBLICATIONS ("Step By Step Guide to Transport Table Contents from One Environment to Other in SAP", Jul. 18, 2013) (Year: 2013).*

(Continued)

*Primary Examiner* — Chat C Do
*Assistant Examiner* — Noor Alkhateeb
(74) *Attorney, Agent, or Firm* — Fish & Richardson P.C.

(57) ABSTRACT

Implementations of the present disclosure include methods, systems, and computer-readable storage mediums for upgrading applications. Actions include receiving an upgrading request for an original table of an application, generating an upgraded table including a structure matching the original table, setting a session variable to initiate an application upgrade, and adding a set of triggers to the original table to selectively control read operations and write operations for the original table and the upgraded table based on the session variable.

20 Claims, 5 Drawing Sheets

(56) References Cited

U.S. PATENT DOCUMENTS

| | | | |
|---|---|---|---|
| 8,572,156 B2 | 10/2013 | Kruempelmann et al. |
| 8,572,565 B2 | 10/2013 | Bozak et al. |
| 8,631,406 B2 | 1/2014 | Driesen et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,530 B2 | 12/2014 | Kruempelmann |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,026,502 B2 | 5/2015 | Driesen et al. |
| 9,031,910 B2 | 5/2015 | Driesen |
| 9,137,130 B2 | 9/2015 | Driesen et al. |
| 9,189,226 B2 | 11/2015 | Driesen et al. |
| 9,201,700 B2 | 12/2015 | Kruempelmann |
| 9,223,985 B2 | 12/2015 | Eberlein et al. |
| 9,229,707 B2 | 1/2016 | Borissov et al. |
| 9,275,120 B2 | 3/2016 | Mayer et al. |
| 9,311,305 B2 | 4/2016 | Buzaski et al. |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,361,326 B2 | 6/2016 | Driesen et al. |
| 9,372,685 B1 | 6/2016 | Luettge et al. |
| 9,430,219 B2 | 8/2016 | Kruempelmann et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,639,448 B2 | 5/2017 | Gebhard et al. |
| 9,678,740 B2 | 6/2017 | Heine et al. |
| 9,684,687 B1 * | 6/2017 | Dubost ............... G06F 16/219 |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,792,342 B2 | 10/2017 | Kruempelmann |
| 9,836,299 B2 | 12/2017 | Eberlein et al. |
| 9,858,309 B2 | 1/2018 | Eberlein et al. |
| 9,870,542 B2 | 1/2018 | Kruempelmann et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 9,984,140 B1 * | 5/2018 | Sukumaran ........... G06F 16/219 |
| 10,013,337 B2 | 7/2018 | Eberlein et al. |
| 10,025,568 B2 | 7/2018 | Mayer et al. |
| 10,055,215 B2 | 8/2018 | Specht et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,191,733 B2 | 1/2019 | Driesen |
| 10,268,472 B2 | 4/2019 | Eberlein et al. |
| 10,268,475 B1 | 4/2019 | Freund et al. |
| 10,268,692 B2 | 4/2019 | Mayer et al. |
| 10,296,324 B2 | 5/2019 | Burkhardt et al. |
| 10,303,665 B2 | 5/2019 | Engelko et al. |
| 10,311,077 B2 | 6/2019 | Specht et al. |
| 10,437,795 B2 | 10/2019 | Eberlein et al. |
| 10,452,646 B2 | 10/2019 | Schlarb et al. |
| 10,678,528 B1 * | 6/2020 | Acheson ............... G06F 8/60 |
| 2003/0222903 A1 | 12/2003 | Herzog et al. |
| 2004/0215637 A1 * | 10/2004 | Kitamura ............... G06F 16/27 |
| 2011/0078122 A1 | 3/2011 | Mayer et al. |
| 2012/0131154 A1 | 5/2012 | Kruesupelmann et al. |
| 2012/0159435 A1 | 6/2012 | Driesen et al. |
| 2013/0085810 A1 | 4/2013 | Driesen et al. |
| 2014/0013203 A1 * | 1/2014 | Rogoveanu ........... G06F 40/166 |
| | | | 715/234 |
| 2014/0019429 A1 | 1/2014 | Driesen et al. |
| 2014/0149568 A1 | 5/2014 | Kruempelmann et al. |
| 2015/0293952 A1 * | 10/2015 | Ogrinz .................. G06F 16/27 |
| | | | 707/702 |
| 2016/0063050 A1 | 3/2016 | Schoen et al. |
| 2016/0098253 A1 | 4/2016 | Hutzel et al. |
| 2016/0098438 A1 | 4/2016 | Eberlein et al. |
| 2016/0321315 A1 * | 11/2016 | Scagnol .................. G06F 8/654 |
| 2016/0358109 A1 | 12/2016 | Kruempelmann |
| 2017/0103226 A1 | 4/2017 | Eberlein et al. |
| 2017/0116296 A1 | 4/2017 | Specht et al. |
| 2017/0123934 A1 | 5/2017 | Bentley |
| 2017/0161291 A1 | 6/2017 | Specht et al. |
| 2017/0161511 A1 | 6/2017 | Eberlein et al. |
| 2017/0286467 A1 | 10/2017 | Eberlein et al. |
| 2017/0315683 A1 * | 11/2017 | Boucher ............... G06F 40/205 |
| 2017/0329505 A1 | 11/2017 | Richter et al. |
| 2017/0344362 A1 | 11/2017 | Burkhardt et al. |
| 2017/0351442 A1 | 12/2017 | Specht et al. |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0137186 A1 * | 5/2018 | Brodt .................. G06F 16/214 |
| 2018/0181386 A1 * | 6/2018 | Uehara .................. G06F 8/65 |
| 2018/0268154 A1 | 9/2018 | Specht et al. |
| 2018/0285097 A1 * | 10/2018 | Radermacher ...... G06F 16/2282 |
| 2018/0285390 A1 | 10/2018 | Mayer et al. |
| 2018/0329930 A1 | 11/2018 | Eberlein et al. |
| 2018/0331927 A1 | 11/2018 | Eberlein et al. |
| 2018/0336365 A1 | 11/2018 | Eberlein et al. |
| 2018/0373767 A1 | 12/2018 | Specht et al. |
| 2019/0018874 A1 | 1/2019 | Eberlein et al. |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Schlarb et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Birn et al. |
| 2019/0220289 A1 | 7/2019 | Driesen et al. |

OTHER PUBLICATIONS

Dj Walker-Morgan, Triggers Arrive on MongoDB Atlas, Jun. 3, 2019 (Year: 2019).*
U.S. Appl. No. 15/970,499, filed May 3, 2018, Eberlein et al.
U.S. Appl. No. 15/983,469, filed May 18, 2018, Driesen et al.
U.S. Appl. No. 15/983,812, filed May 18, 2018, Eberlein et al.
U.S. Appl. No. 15/996,804, filed Jun. 4, 2018, Hauck et al.
U.S. Appl. No. 15/996,661, filed Jun. 4, 2018, Freund et al.
U.S. Appl. No. 16/005,927, filed Jun. 12, 2018, Kruempelmann et al.
U.S. Appl. No. 16/173,225, filed Oct. 29, 2018, Eberlein et al.
U.S. Appl. No. 16/197,888, filed Nov. 21, 2018, Meissner et al.
U.S. Appl. No. 16/208,920, filed Dec. 4, 2018, Eberlein et al.
U.S. Appl. No. 16/214,724, filed Dec. 10, 2018, Eberlein et al.
U.S. Appl. No. 16/219,358, filed Dec. 13, 2018, Eberlein et al.
U.S. Appl. No. 16/219,371, filed Dec. 13, 2018, Eberlein et al.
U.S. Appl. No. 16/410,076, filed May 13, 2019, Eberlein et al.
U.S. Appl. No. 16/455,072, filed Jun. 27, 2019, Eberlein et al.
U.S. Appl. No. 16/521,642, filed Jul. 25, 2019, Eberlein et al.
U.S. Appl. No. 16/580,318, filed Sep. 24, 2019, Eberlein et al.
Extended European Search Report issued in European Application No. 20211875.8 dated Apr. 26, 2021, 7 pages.

* cited by examiner

FENCING EXECUTION OF EXTERNAL TOOLS DURING SOFTWARE CHANGES

BACKGROUND

During standard execution, applications are configured to read and write data from tables. Software upgrades may include software and data changes. During software upgrade processes, an original application may be set to read and write only data from original tables that have not been changed. Generally, data changed during the software upgrade processes is not accessible for reading or writing by the original application. The upgraded data usually becomes accessible after the software upgrade process is completed. A typical approach for handling software changes is initiated by an upgrade tool that creates a clone of the tables used by the application being changed. The typical approach can ensure that the software change process does not disturb actual tables written to by the application. During the upgrade, transport data is deployed to a clone-table. After the upgrade, a production environment is switched to use the clone-table. There are drawbacks associated with the typical approach.

SUMMARY

The present disclosure describes techniques for upgrading applications.

In a particular implementation, a computer-implemented method includes: receiving an upgrading request for an original table of an application, generating an upgraded table including a structure matching the original table, setting a session variable to initiate an application upgrade, and adding a set of triggers to the original table to selectively control read operations and write operations for the original table and the upgraded table based on the session variable.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. Implementations of the present disclosure can include a modification of a multisystem landscape to provide temporarily fencing of execution of an external tool during software changes to support upgrading of applications and corresponding tables, thereby reducing downtime, as well as reducing storage and processing requirements. For example, downtime can be reduced by generating "hidden changes" of tables in a database (that are not visible to a client of the production system) and substantially instantaneously switching from an original table and an original application to an upgraded table and an upgraded application. Under the described approach, the multi-system landscape includes reading and writing database triggers that selectively manage writing and reading operations in the original and the upgraded tables, without the need to completely replicate large data sets. For example, not all data entries need to be copied for upgraded applications. Using the described implementation enables time and resource management, such that only relevant data (data associated with upgraded applications) is extracted from the original tables and upgraded. Additionally, the upgraded data can be stored using formats that minimize storage requirements. Further, the disclosed system enables parallel upgrading procedures to upgrade multiple components (modules) of an application and seamlessly switch from the original components of the application to the upgraded components of the application.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for performing upgrading applications in a multi-system landscape and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Multi-system landscapes are computing architectures including multiple different computing systems (for example, a quality system, a deployment system, and a production system), technologies and components that are operated by multiple personnel (for example, developers, administrators, and operators). The quality system is used to prepare application data and application changes. The quality system can ensure "quality" of upgraded applications through the use of testing. Upgraded (updated) applications and corresponding data can be packaged and transmitted to the production system by a deployment system. In optimal conditions, the upgraded applications are deployed to the production system with zero downtime. The production system is often considered as having higher priority for availability than the quality system because availability of the production system can affect multiple clients (users). For zero downtime deployment, upgraded data transported by the deployment system is invisible to the running production system. If the upgraded data is visible to the running production system, the deployed upgraded data can disrupt operation of the running production system. To prevent deployment errors, the upgraded data transported by the deployment system is generally locked against modifications by an original (not upgraded) application.

Several problems exist when using upgrading applications procedures in a current multi-system landscape. First, for example, an upgrade tool creates a clone of the tables used by the application and being changed that requires additional storage for the cloned tables. Applications are composites not only of code but also of configurations, database content, and calls to external services. For example, a database can store tens of thousands of tables, each with thousands or millions of data entries. Considering the large number of tables and their large sizes, cloning tables based on complete data replication implies major additional storage requirements (for example, approximately a third of the database can be specifically allocated to temporary cloned tables). Further, the current upgrade procedures require additional processing resources to clone the table and to run the triggers to replicate data. Additionally, modifications of a multi-system landscape for upgrading applications are related to decreased production speed. Current procedures for upgrading applications can slow down production, as database triggers (or "triggers") are integrated, which act upon write operations. Another drawback is that the switch from a quality system to a production system requires a downtime, during which the application cannot be used. Techniques for upgrading applications can temporarily fence the application to efficiently manage data access and table changes.

Described is a content change management process using a multi-system landscape that can minimize storage and processing resources and can optimize table changes by upgrading applications without production downtime. Here, "better" is used in the sense of, among other things as will be appreciated by those of ordinary skill in the art, improved performance, less resource usage, easier to extend, and less impact on a software change to production. The described solution uses triggers to manage reading and writing of data and uses session variables to verify consistency of the upgrade process. The described solution provides upgraded tables without a duplication of large data sets. The upgrading approach includes "hidden changes" of tables in a database and substantially instantaneously switching on from an original to an upgraded table, without the need to replicate large data sets. In this way, tables in multi-system landscape can be upgraded with triggers that improve processes and applications.

Figure 1:
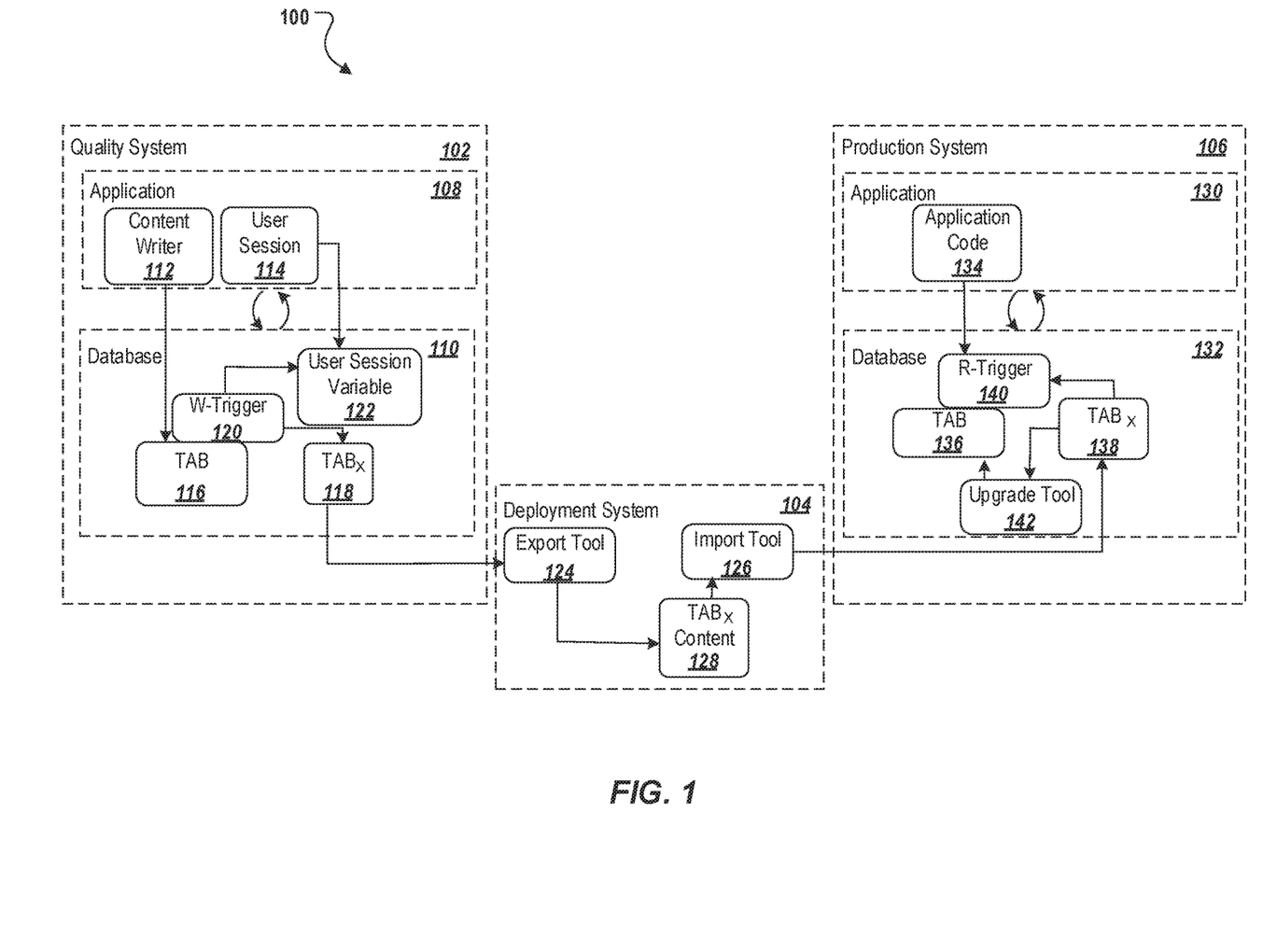
FIG. 1 is a block diagram illustrating component/data relationships for an upgrading applications framework, according to an implementation of the present disclosure.

FIG. 1 is a block diagram illustrating component/data relationships for a multi-system landscape 100 that employs a change management process, according to an implementation of the present disclosure. FIG. 1 is provided for example purposes only to enhance understanding of the presented concepts. As will be appreciated for those of ordinary skill in the art, there are a myriad of possible ways to present or to arrange the presented components, to structure their interactions, or to describe inter/intra-component interactions/communications. In as far as they are consistent with this disclosure, the other possible presentations or arrangements, structures, or descriptions are considered to be within the scope of this disclosure.

At a high-level and in some implementations, the described multi-system landscape 100 includes a quality (development) system 102, a deployment system 104, and a production (operation) system 106. The quality system 102 can be configured to perform the steps to recalculate new table values for an upgrade process. The quality system 102 includes a quality application 108 and a quality database 110. The quality application 108 includes a content writer 112 and a user session 114. The content writer 112 can be configured to write data in the quality original tables 116. The user session 114 can be configured to define sessions, including upgrade sessions. For example, the user session 114 can be configured to mark a beginning of a session, an end of a session, and a session identifier. The quality database 110 includes quality original tables 116, upgraded tables 118, writing triggers 120, and user session variables 122. To initiate the upgrade of the quality application 108, quality original tables 116 that are accessed by the quality application 108 are identified and their structure is determined. The upgrading tool is configured to generate empty upgraded tables 118 in the quality database 110 with structures matching the structure of the identified quality original tables 116. A set of writing triggers 120 (such as, create trigger on insert, create trigger on update, create trigger on upsert) are created and added to the quality original table 116. The writing triggers 120 can be configured to detect whether the content writer 112 writes data to the quality original tables. In response to detecting that new data is written, the writing triggers 120 can be configured to copy the data from the quality original tables 116 to the upgraded tables 118. In some implementations, the data generated during the upgrade process can be filtered based on data types, such that only data associated to the upgraded application is stored to optimize data storage based on relevance. A user session variable 122 can be set in the quality database 110 by the user session module 114 of the quality application 108 to identify data written to the upgraded tables 118 during the upgrade procedure by the writing triggers 120. The user session 114 can be configured to provide an output indicating that changes of the upgraded tables 118 are complete and the deployment system 104 can transport the upgraded tables 118 to the production system 106.

The deployment system 104 can include an export tool 124, an import tool 126, and a table content file 128. The export tool 124 can be configured to communicate with the upgraded tables 118. The export tool 124 can read the data from the upgraded tables 118 and write the data to the table content file 128. In some implementations, the data export tool 124 can be configured to provide an output to the database to indicate successful copy of the content of the upgraded tables 118. In response to the indication of successful copy of the content of the upgraded tables 118, the upgraded tables 118 are deleted from the quality database 110 and a subsequent scheduled (upgrading) session can start. In response to deployment of the content of the upgraded tables 118, the import-tool 126 can read the data from the table content file 128 and write the content to the production system 106.

The production system 106 includes a production application 130 and a production database 132. The production system 106 (for example, application systems or tenants executing software) is used to read data associated with applications 130 for processing and upgrading procedures affecting the database 132. In some implementations, the data is selected by an application code 134 of the production application 130 that is configured to communicate with the production database 132 (for example, an in-memory database such as SAP HANA), and an application server (for example, SAP ABAP). The production database 132 and the production application 130 can provide monitoring application programming interfaces (APIs) to read/collect statistical data during upgrades. The production database 132 includes production original tables 136, upgraded tables 138, reading triggers 140, and an upgrade tool 142. The production database 132 can be configured to generate empty upgraded tables 138 that match the structure of the production original tables 136 called by the production application 130 undergoing an upgrade process. The production database 132 receives as input the content of the upgraded tables 138 from import tool 126 of the deployment system 104. In response to determining that the deployment is complete, the reading triggers 140 are configured to read data from the upgraded tables 138 or from the production original tables 136 based on a priority setting. The priority setting of the reading triggers 140 can ensure that the data is read consistently from the upgraded tables 138 rather than the production original tables 136 for upgraded applications. For example, during the upgrade process, the application code 134 transmits a read-access request to the production original tables 136. The read request is re-directed to the reading trigger 140. The reading trigger 140 determines whether the read request is generated by an original application or an upgraded application. In response to determining that the read request is received from an original application, the reading trigger 140 returns the respective value from the production original table 136. In response to determining that the read request is received from an upgraded application, the reading trigger 140 returns the respective value from the upgraded table 138, if a corresponding data entry is stored in the upgraded tables 138. The upgrade tool 142 can read data from the upgraded tables 138, execute the upgrade process, and "upsert" data (update data entry if a record exists or insert a data entry if a record does not exist) of the production original tables 136. The upgrade tool 142 can be configured to determine the completion of the upgrade of the production original tables 136 and delete data from the upgraded tables 138. In response to deleting the data from the upgraded tables 138, the reading triggers 140 can be configured to replace reading from the upgraded tables 138 with reading from the production original tables 136, which have been updated to include the upgraded data.

Figure 2A:
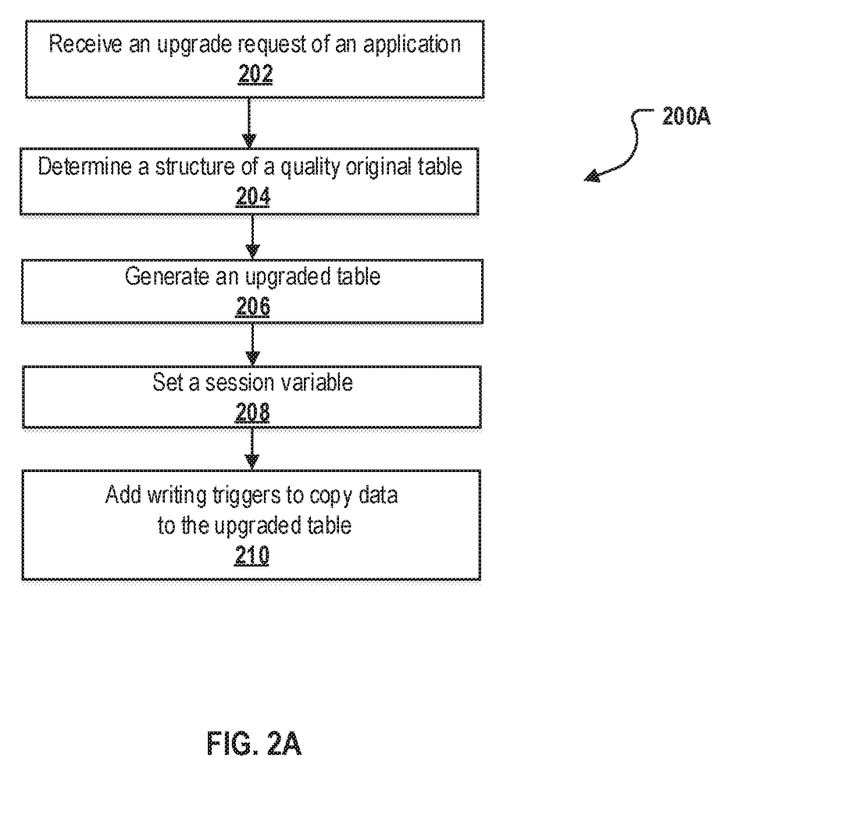
FIGS. 2A-2C are flowcharts illustrating examples of computer-implemented methods for upgrading applications, according to some implementations of the present disclosure.
Figure 2B:
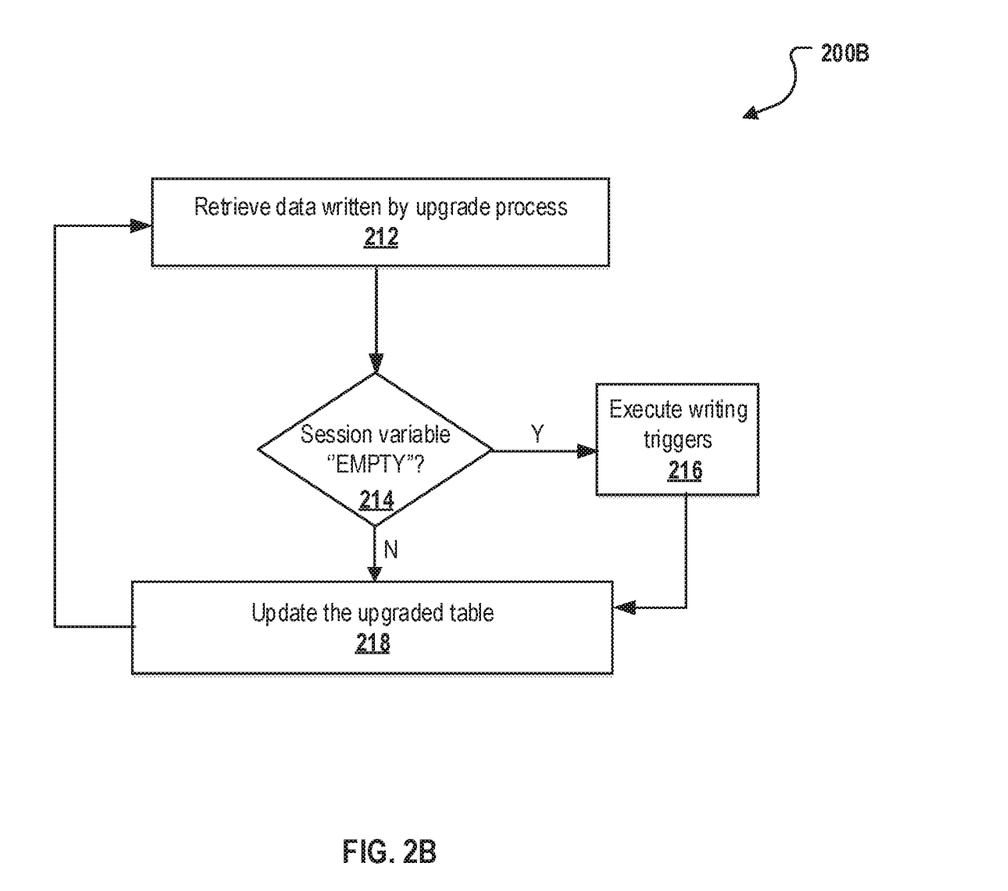
Figure 2C:
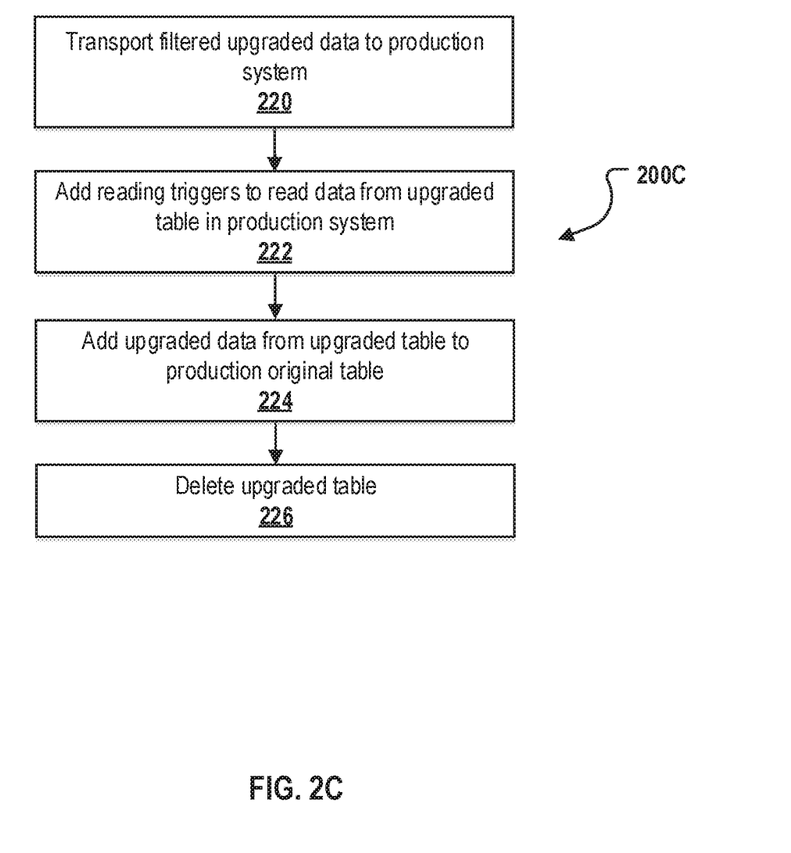

FIGS. 2A-2C are flowcharts illustrating examples of computer-implemented methods 200A, 200B, 200C for upgrading applications, according to some implementations of the present disclosure. For clarity of presentation, the description that follows generally describes methods 200A, 200B, 200C in the context of the other figures in this description. However, it will be understood that methods 200A, 200B, 200C can be performed, for example, by any system, environment, software, and hardware, or a combination of systems, environments, software, and hardware, as appropriate. The methods 200A, 200B, 200C can be executed in series or independent from each other. In some implementations, various steps of methods 200A, 200B, 200C can be run in parallel, in combination, in loops, or in any order.

In method 200A, at 202, an application-upgrade request is received. The application-upgrade request can include a request to upgrade an entire application, a version of an application, or a portion of the application (for example, one or more identified software modules). The application-upgrade request can include an identifier of the application to be upgraded. In some implementations, the application-upgrade request can be generated by a software developer in a quality system or by a customer interacting with the production system and transmitted to the quality system. The application-upgrade request can include a description of a software extension or upgrade. In some implementations, the application-upgrade request includes identifiers of a quality original table that is potentially affected by the upgrading procedure. After 202, method 200A proceeds from 202 to 204.

At 204, a structure of a quality original table that is potentially affected by the upgrading procedure is determined. The structure includes the size of the table (for example, number of rows and columns) and the data types stored within the table. After 204, method 200A proceeds to 206.

At 206, an empty upgraded table matching the structure of the quality original table is generated. For example, if the application-upgrade request is absent of an indication that an upgraded data type should be different from the original data type stored by the quality original table, the upgraded table is configured to have the same size as the quality original table and can be configured to store the same data type as the quality original table. Otherwise, if the application-upgrade request includes an indication that an upgraded data type should be different from the original data type, the upgraded table is configured to have the same size as the quality original table and can be configured to store one or more upgraded data types. After 206, method 200A proceeds to 208.

At 208, a session variable is set for the upgrade session. The session variable can include an identifier of an upgrade session, a (temporal) marker of a starting point of the upgrade session, and a (temporal) marker of a completion of the upgrade session. The session variable can be set in the quality database by a user session module of the quality application to identify data written to the upgraded tables during the upgrade procedure by writing triggers. A value of the session variable can be modified during the upgrade session, different values being configured to identify and trigger different operations. For example, the application logic can set the initial value of the session variable to zero or an empty field and during the update procedure the initial value of the session variable can be set to "upgrade" or "update". The initial value of the session variable can be configured to trigger a switch to (initiation of) the new behavior (execution and testing of an upgrade process) in the quality system. Another value of the session variable can be configured to trigger generation of an output indicating that the changes of the upgraded tables are complete and the deployment system can transport the upgraded tables to the production system. After 2108, method 200A proceeds to 210.

At 210, writing triggers are added to the quality original table to copy data to the upgraded table. The writing triggers can include multiple trigger types, such as create trigger on insert, create trigger on update, or create trigger on upsert. The writing triggers can be configured to determine whether a content writer writes data to the quality original tables and, in response to determining that the content writer wrote data to the quality original tables, copy the recently written data from the quality original tables to the upgraded tables. In some implementations, the data copied to the upgraded tables includes the data recently written data in the quality original table and the session variable, identifying the upgrade session during which the data was copied. After 210, method 200A can proceed to method 200B.

In method 200B, at 212, upgraded data previously written by an upgrade process is retrieved. After 212, method 200B proceeds to 214.

At 214, the upgraded data is filtered using the session variable. Data filtering includes determining whether each of the data entries in the upgraded table corresponds to a particular session variable, such as an empty field. The data filtering process distinguishes between the data written by the upgrade procedure and data written by a normal usage of the system.

In response to determining that a particular data entry in the upgraded table corresponds to the respective session variable (e.g., empty), method 200B proceeds from 214 to 216. At 216, the writing triggers can be executed to continue the upgrading process. After 216, method 200B proceeds to 218.

In response to determining that the remaining data in the upgraded tables includes another valid session variable (e.g., "upgrade"), the method 200B proceeds from 214 to 218. At 218, the writing trigger can replicate the data written by the upgrade procedure to the upgraded table to continue the upgrading process. After 218, method 200B can loop back to 212 until all data written by the upgrade process is added to the upgraded table. In some implementations, the method 200B loops back multiple (e.g., thousands of times) to update the upgraded tables repeatedly. After 218, in response to determining that all triggered updates have been completed method 200B can proceed to method 200C.

In method 200C, at 220, in response to determining that the changes of the upgraded tables are complete, the content of the filtered upgraded tables is transported from the quality system to the production system. In some implementations, the deployment of upgraded data includes deletion of the upgraded data from the database of the quality system after the entire content of the upgraded data was copied. After 220, method 200C proceeds to 222.

At 222, reading triggers are added to the production system to manage data reading during a production phase of the upgrading procedure. In some implementations, in response to determining that the deployment of the upgraded data content is complete, the reading triggers are automatically generated and added to the production system. The reading triggers are configured to selectively read data from the upgraded tables or from the production original tables based on a priority setting. The priority setting of the reading triggers can ensure that the data is read consistently from the upgraded tables rather than the production original tables for upgraded applications. For example, during the upgrade process, the application code transmits a read-access request to the production original tables. The read request is redirected to the reading triggers. The reading triggers determine whether the read request is generated by an original application or an upgraded application. In response to determining that the read request is received from an original application, the reading triggers return the respective value from the production original table. In response to determining that the read request is received from an upgraded application and that a corresponding data entry is stored in the upgraded tables, the reading triggers return the respective value from the upgraded table. After 222, method 200C proceeds to 224.

At 224, data read from the upgraded tables is added (upserted) to the production original tables. After 224, method 200C proceeds to 226.

At 226, an outcome (for example, success or failure) of the upgrade process is determined. For example, in response to determining that the upgrade of the production original tables is successfully completed, the data from the upgraded tables and the original application can be deleted. In some implementations, in response to deleting the data from the upgraded tables, the reading triggers can be configured to replace reading from the upgraded tables with reading from the production original tables. After 226, method 200C can stop or can loop back to 220, or any of the methods 200A and 200B.

In some implementations, the methods 200A, 200B, 200C can be performed in parallel for multiple upgrade sessions that do not interfere with each other (for example, correspond to separate application modules that call separate data entries in the original tables). Each of the parallel upgrade sessions can be separately identified by a respective session variable. For example, upgraded data corresponding to multiple upgrade sessions can be stored within a single upgraded table, each data entry being associated with a session variable that enables identification of the respective upgrade session.

Figure 3:
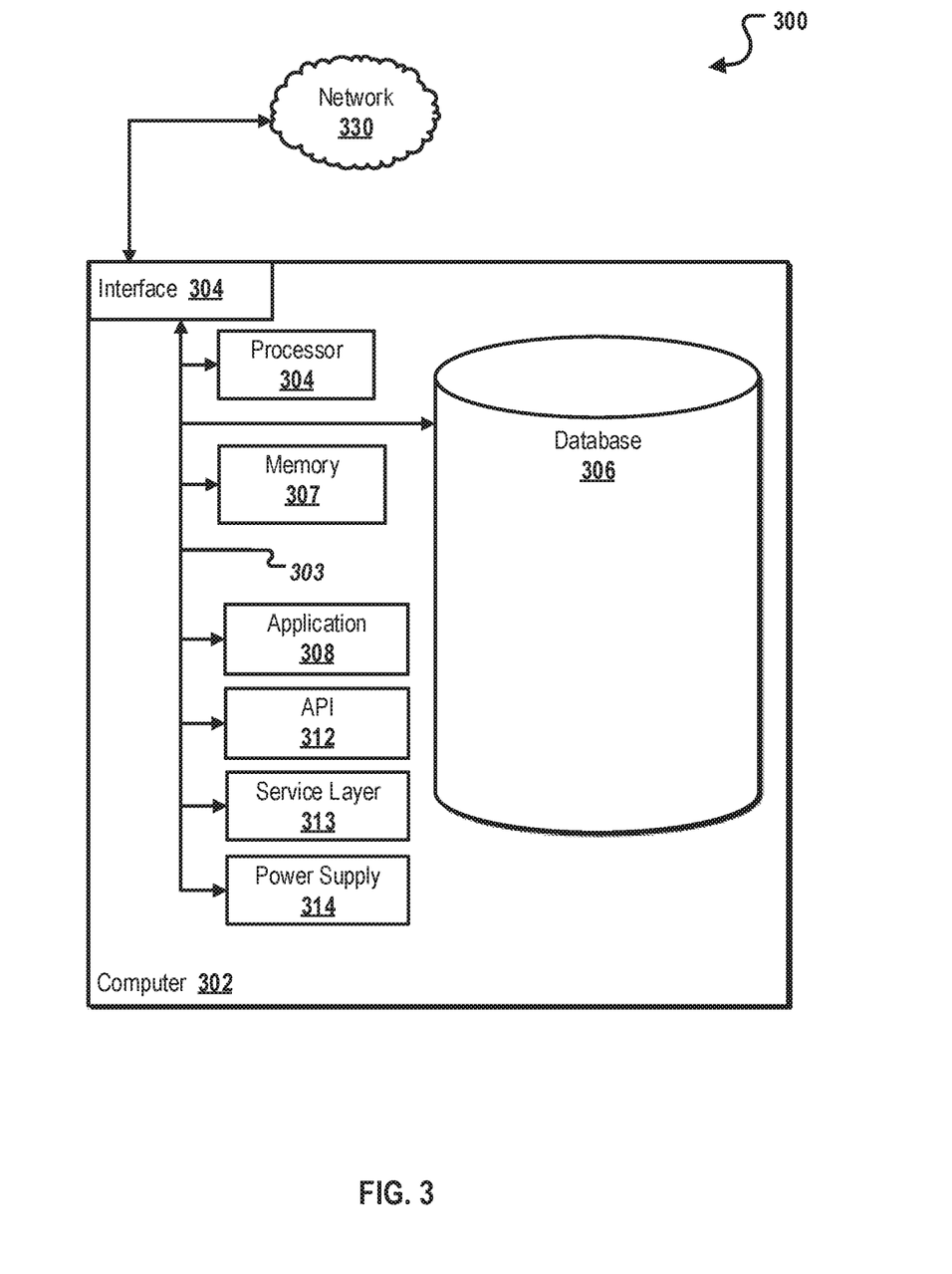
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing image reconstruction as described in the present disclosure. The illustrated Computer 302 is communicably coupled with a Network 330. In some implementations, one or more components of the Computer 302 can be configured to operate within an environment, including cloud computing based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, email server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application-programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, some implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, disk storage, or another type of database storing data consistent with the present disclosure. In some implementations, Database 306 can be a combination of two or more different database types (for example, a hybrid in-memory and disk storage database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in some implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 of similar or differing types can be used according to particular needs, desires, or particular implementations of the Computer 302 and the described functionality. While Memory 307 is illustrated as an integral component of the Computer 302, in some implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in some implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple Computers 302.

Described implementations of the subject matter can include one or more features, alone or in combination.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

The foregoing and other described implementations can each, optionally, include one or more of the following features:

For example, in a first implementation, a computer-implemented method, including: receiving an upgrading request for an original table of an application, generating an upgraded table including a structure matching the original table, setting a session variable to initiate an application upgrade, and adding a set of triggers to the original table to selectively control read operations and write operations for the original table and the upgraded table based on the session variable.

The foregoing and other described implementations can each, optionally, include one or more of the following features:

A first feature, combinable with any of the following features, wherein the original table includes a quality original table of a quality system and the set of triggers includes writing triggers configured to copy data written to the quality original table to the upgraded table in a quality system.

A second feature, combinable with any of the previous or following features, further including: transporting the upgraded table from the quality system to a production system.

A third feature, combinable with any of the previous or following features, wherein the original table includes a production original table of the production system and the set of triggers includes reading triggers configured to perform a set of operations including: reading original data from the original table for a first type of reading requests originated from an original application of the production system, reading upgraded data from the upgraded table for a second type of reading requests originated from an upgraded application of the production system, and adding the upgraded data from the upgraded table to the production original table of the production system.

A fourth feature, combinable with any of the previous or following features, further including: determining an original structure of the original table.

A fifth feature, combinable with any of the previous or following features, further including: determining that data stored in the upgraded table includes the session variable.

In a second implementation, a non-transitory computer-readable storage medium coupled to one or more processors and having instructions stored thereon which, when executed by the one or more processors, cause the one or more processors to perform operations for test optimization, the operations including: receiving an upgrading request for an original table of an application, generating an upgraded table including a structure matching the original table, setting a session variable to initiate an application upgrade, and adding a set of triggers to the original table to selectively control read operations and write operations for the original table and the upgraded table based on the session variable.

The foregoing and other described implementations can each, optionally, include one or more of the following features:

A first feature, combinable with any of the following features, wherein the original table includes a quality original table of a quality system and the set of triggers includes writing triggers configured to copy data written to the quality original table to the upgraded table in a quality system.

A second feature, combinable with any of the previous or following features, wherein the operations further include: transporting the upgraded table from the quality system to a production system.

A third feature, combinable with any of the previous or following features, wherein the original table includes a production original table of the production system and the set of triggers includes reading triggers configured to perform a second set of operations including: reading original data from the original table for a first type of reading requests originated from an original application of the production system, reading upgraded data from the upgraded table for a second type of reading requests originated from an upgraded application of the production system, and adding the upgraded data from the upgraded table to the production original table of the production system.

A fourth feature, combinable with any of the previous or following features, further including: determining an original structure of the original table.

A fifth feature, combinable with any of the previous or following features, wherein the operations further include: determining that data stored in the upgraded table includes the session variable.

In a third implementation, a computer-implemented system, including: a client-side computing device, and a computer-readable storage device coupled to the client-side computing device and having instructions stored thereon which, when executed by the client-side computing device, cause the client-side computing device to perform operations for test optimization. The operations include: receiving an upgrading request for an original table of an application, generating an upgraded table including a structure matching the original table, setting a session variable to initiate an application upgrade, and adding a set of triggers to the original table to selectively control read operations and write operations for the original table and the upgraded table based on the session variable.

The foregoing and other described implementations can each, optionally, include one or more of the following features:

A first feature, combinable with any of the following features, wherein the original table includes a quality original table of a quality system and the set of triggers includes writing triggers configured to copy data written to the quality original table to the upgraded table in a quality system.

A second feature, combinable with any of the previous or following features, wherein the operations further include: transporting the upgraded table from the quality system to a production system.

A third feature, combinable with any of the previous or following features, wherein the original table includes a production original table of the production system and the set of triggers includes reading triggers configured to perform a second set of operations including: reading original data from the original table for a first type of reading requests originated from an original application of the production system, reading upgraded data from the upgraded table for a second type of reading requests originated from an upgraded application of the production system, and adding the upgraded data from the upgraded table to the production original table of the production system.

A fourth feature, combinable with any of the previous or following features, further including: determining an original structure of the original table.

A fifth feature, combinable with any of the previous or following features, wherein the operations further include: determining that data stored in the upgraded table includes the session variable.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Particular features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in particular combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In particular circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for upgrading applications, the method being executed using one or more processors and comprising:
   receiving, by the one or more processors, an upgrading request for an original table of an application that is used in a production system;
   generating, by the one or more processors, an upgraded table comprising a structure matching the original table and empty fields;
   setting, by the one or more processors, a session variable to initiate an application upgrade within a quality system, the session variable comprising an identifier of an upgrade session and one or more temporal markers of the upgrade session;
   adding, by the one or more processors, a set of triggers to the original table comprising reading triggers and writing triggers to selectively control read operations and write operations for the original table being used in the production system and the upgraded table being used in the quality system, wherein the read operations and the write operations are controlled based on the session variable, the read operations being triggered by the reading triggers configured to selectively read data from the upgraded table or from the original table based on a priority setting, after a deployment of the upgraded table is complete, and the write operations being triggered by the writing triggers configured to copy newly added data from the original table;
   detecting, by the one or more processors, using the set of triggers, that new data associated to the application was generated;
   filtering, by the one or more processors, using the session variable, the new data to generate filtered data comprising a portion of the new data associated to the application generated by an upgrade procedure of the quality system during the upgrade session;

inserting, by the one or more processors, using the set of triggers, the filtered data in the upgraded table, wherein the filtered data generated by the upgrade procedure of the quality system during the upgrade session is hidden from the production system until at least one temporal marker of the one or more temporal markers of the upgrade session indicates a completion of the upgrade session;

determining, by the one or more processors, a completion of the upgrade session; and triggering, by the one or more processors, the deployment of the upgraded table, using a deployment system, to transport the upgraded table to the production system.

2. The computer-implemented method of claim 1, wherein the original table comprises a quality original table of the quality system and the set of triggers comprises writing triggers configured to copy data written from the quality original table to the upgraded table in the quality system.

3. The computer-implemented method of claim 2, further comprising:

transporting the upgraded table from the quality system to the production system.

4. The computer-implemented method of claim 3, wherein the original table comprises a production original table of the production system and the reading triggers are configured to perform production reading operations comprising:

reading original data from the original table for a first type of reading requests originated from an original application of the production system; and reading upgraded data from the upgraded table for a second type of reading requests originated from an upgraded application of the production system.

5. The computer-implemented method of claim 4, further comprising:

adding the upgraded data from the upgraded table to the production original table of the production system.

6. The computer-implemented method of claim 1, further comprising:

determining an original structure of the original table.

7. The computer-implemented method of claim 1, further comprising:

determining that data stored in the upgraded table comprises the session variable.

8. A non-transitory computer-readable storage medium coupled to one or more processors and having instructions stored thereon which, when executed by the one or more processors, cause the one or more processors to perform operations for upgrading applications, the operations comprising:

receiving an upgrading request for an original table of an application that is used in a production system;

generating an upgraded table comprising a structure matching the original table and empty fields;

setting a session variable to initiate an application upgrade within a quality system, the session variable comprising an identifier of an upgrade session and one or more temporal markers of the upgrade session;

adding a set of triggers to the original table comprising reading triggers and writing triggers to selectively control read operations and write operations for the original table being used in the production system and the upgraded table being used in the quality system, wherein the read operations and the write operations are controlled based on the session variable, the read operations being triggered by the reading triggers configured to selectively read data from the upgraded table or from the original table based on a priority setting, after a deployment of the upgraded table is complete, and the write operations being triggered by the writing triggers configured to copy newly added data from the original table;

detecting using the set of triggers, that new data associated to the application was generated;

filtering using the session variable, the new data to generate filtered data comprising a portion of the new data associated to the application generated by an upgrade procedure of the quality system during the upgrade session;

inserting using the set of triggers, the filtered data in the upgraded table, wherein the filtered data generated by the upgrade procedure of the quality system during the upgrade session is hidden from the production system until at least one temporal marker of the one or more temporal markers of the upgrade session indicates a completion of the upgrade session;

determining a completion of the upgrade session; and triggering the deployment of the upgraded table, using a deployment system, to transport the upgraded table to the production system.

9. The non-transitory computer-readable storage medium of claim 8, wherein the original table comprises a quality original table of the quality system and the set of triggers comprises writing triggers configured to copy data written from the quality original table to the upgraded table in the quality system.

10. The non-transitory computer-readable storage medium of claim 9, wherein the operations further comprise:

transporting the upgraded table from the quality system to the production system.

11. The non-transitory computer-readable storage medium of claim 10, wherein the original table comprises a production original table of the production system and the reading triggers are configured to perform production reading operations comprising:

reading original data from the original table for a first type of reading requests originated from an original application of the production system; and reading upgraded data from the upgraded table for a second type of reading requests originated from an upgraded application of the production system.

12. The non-transitory computer-readable storage medium of claim 11, wherein the operations further comprise:

adding the upgraded data from the upgraded table to the production original table of the production system.

13. The non-transitory computer-readable storage medium of claim 8, wherein the operations further comprise:

determining an original structure of the original table.

14. The non-transitory computer-readable storage medium of claim 8, wherein the operations further comprise:

determining that data stored in the upgraded table comprises the session variable.

15. A computer-implemented system for upgrading applications, the computer-implemented system comprising:

a client-side computing device; and a computer-readable storage device coupled to the client-side computing device and having instructions stored thereon which, when executed by the client-side computing device, cause the client-side computing device to perform operations for upgrading applications, the operations comprising:

receiving an upgrading request for an original table of an application that is used in a production system;

generating an upgraded table comprising a structure matching the original table and empty fields;

setting a session variable to initiate an application upgrade within a quality system, the session variable comprising an identifier of an upgrade session and one or more temporal markers of the upgrade session;

adding a set of triggers to the original table comprising reading triggers and writing triggers to selectively control read operations and write operations for the original table being used in the production system and the upgraded table being used in the quality system, wherein the read operations and the write operations are controlled based on the session variable, the read operations being triggered by the reading triggers configured to selectively read data from the upgraded table or from the original table based on a priority setting, after a deployment of the upgraded table is complete, and the write operations being triggered by the writing triggers configured to copy newly added data from the original table;

detecting using the set of triggers, that new data associated to the application was generated;

filtering using the session variable, the new data to generate filtered data comprising a portion of the new data associated to the application generated by an upgrade procedure of the quality system during the upgrade session;

inserting using the set of triggers, the filtered data in the upgraded table, wherein the filtered data generated by the upgrade procedure of the quality system during the upgrade session is hidden from the production system until at least one temporal marker of the one or more temporal markers of the upgrade session indicates a completion of the upgrade session;

determining a completion of the upgrade session; and triggering the deployment of the upgraded table, using a deployment system, to transport the upgraded table to the production system.

16. The computer-implemented system of claim 15, wherein the original table comprises a quality original table of the quality system and the set of triggers comprises writing triggers configured to copy data written from the quality original table to the upgraded table in the quality system.

17. The computer-implemented system of claim 16, wherein the operations further comprise:

transporting the upgraded table from the quality system to the production system.

18. The computer-implemented system of claim 17, wherein the original table comprises a production original table of the production system and the reading triggers are configured to perform production reading operations comprising:

reading original data from the original table for a first type of reading requests originated from an original application of the production system;

reading upgraded data from the upgraded table for a second type of reading requests originated from an upgraded application of the production system; and adding the upgraded data from the upgraded table to the production original table of the production system.

19. The computer-implemented system of claim 15, wherein the operations further comprise:

determining an original structure of the original table.

20. The computer-implemented system of claim 15, wherein the operations further comprise:

determining that data stored in the upgraded table comprises the session variable.

* * * * *